(12) United States Patent
Bartl et al.

(10) Patent No.: US 9,403,186 B2
(45) Date of Patent: Aug. 2, 2016

(54) PHOTONIC DEVICES ON PLANAR AND CURVED SUBSTRATES AND METHODS FOR FABRICATION THEREOF

(71) Applicant: University of Utah Research Foundation, Salt Lake City, UT (US)

(72) Inventors: Michael H. Bartl, Salt Lake City, UT (US); Moussa Barhoum, Darmstadt (DE); David Riassetto, Saint Martin d'uriage (FR)

(73) Assignee: University of Utah Research Foundation, Salt Lake City, UT (US)

( * ) Notice: Subject to any disclaimer, the term of this patent is extended or adjusted under 35 U.S.C. 154(b) by 0 days.

(21) Appl. No.: 14/362,037

(22) PCT Filed: Nov. 29, 2012

(86) PCT No.: PCT/US2012/067131
§ 371 (c)(1),
(2) Date: May 30, 2014

(87) PCT Pub. No.: WO2013/130140
PCT Pub. Date: Sep. 6, 2013

(65) Prior Publication Data
US 2014/0287147 A1    Sep. 25, 2014

Related U.S. Application Data

(60) Provisional application No. 61/565,801, filed on Dec. 1, 2011.

(51) Int. Cl.
*B05D 3/02* (2006.01)
*C23C 18/12* (2006.01)
*G02B 5/28* (2006.01)

(52) U.S. Cl.
CPC .......... *B05D 3/0254* (2013.01); *C23C 18/1216* (2013.01); *C23C 18/1225* (2013.01); *C23C 18/1245* (2013.01); *C23C 18/1254* (2013.01); *C23C 18/1283* (2013.01); *G02B 5/285* (2013.01)

(58) Field of Classification Search
CPC .............................. B05D 3/0234; C23C 18/00
See application file for complete search history.

(56) References Cited

U.S. PATENT DOCUMENTS 5,219,611 A    6/1993    Giannelis et al.
5,433,941 A    7/1995    Patel
(Continued)

FOREIGN PATENT DOCUMENTS

| WO | 9806770 | 2/1998 |
| WO | 2010076429 | 7/2010 |
| WO | 2011087374 | 7/2011 |

OTHER PUBLICATIONS

Maria Zaharescu and Maria Crisan. Atomic Force Microscopy Study of TiO2 Films Obtained by the Sol-Gel Method. 1998. Journal of Sol-Gel Science and Technology. 13, 769-773.*

(Continued)

*Primary Examiner* — Dah-Wei D Yuan
*Assistant Examiner* — Kristen A Dagenais
(74) *Attorney, Agent, or Firm* — Workman Nydegger

(57) ABSTRACT

A versatile and rapid sol-gel technique for the fabrication of high quality one-dimensional photonic bandgap materials. For example, silica/titania multi-layer materials may be fabricated by a sol-gel chemistry route combined with dip-coating onto planar or curved substrate. A shock-cooling step immediately following the thin film heat-treatment process is introduced. This step was found important in the prevention of film crack formation—especially in silica/titania alternating stack materials with a high number of layers. The versatility of this sol-gel method is demonstrated by the fabrication of various Bragg stack-type materials with fine-tuned optical properties by tailoring the number and sequence of alternating layers, the film thickness and the effective refractive index of the deposited thin films. Measured optical properties show good agreement with theoretical simulations confirming the high quality of these sol-gel fabricated optical materials.

26 Claims, 8 Drawing Sheets

(56) References Cited

U.S. PATENT DOCUMENTS

| | | | |
|---|---|---|---|
| 5,565,245 A | 10/1996 | Sun et al. | |
| 5,790,503 A | 8/1998 | Mizuno et al. | |
| 2003/0230740 A1* | 12/2003 | Yuan et al. | 252/301.4 R |
| 2007/0184557 A1* | 8/2007 | Crudden et al. | 436/171 |
| 2008/0145625 A1* | 6/2008 | Schumacher et al. | 428/195.1 |
| 2011/0149400 A1* | 6/2011 | Miguez Garcia et al. | 359/589 |
| 2011/0236680 A1* | 9/2011 | Jahrling et al. | 428/339 |
| 2011/0287215 A1 | 11/2011 | Bishop et al. | |

OTHER PUBLICATIONS

Zaharescu et al., "Atomic Force Microscopy Study of $TiO_2$ Films Obtained by the Sol-Gel Method", Journal of Sol-Gel Science and Technology,13: 769-773, 1998.

International Search Report and Written Opinion, PCT/US2012/067131, U.S. International Search Authority, Completed Jul. 30, 2013, Mailed Aug. 7, 2013.

European Search Report for EP12869758 date Jul. 7, 2015.

* cited by examiner 400 micron 400 micron 300 micron 300 micron

FIG. 3A                  FIG. 3B

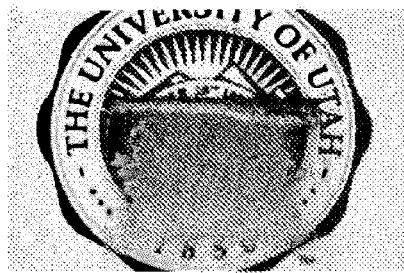
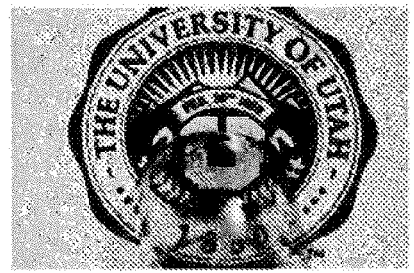
FIG. 4A  FIG. 4B
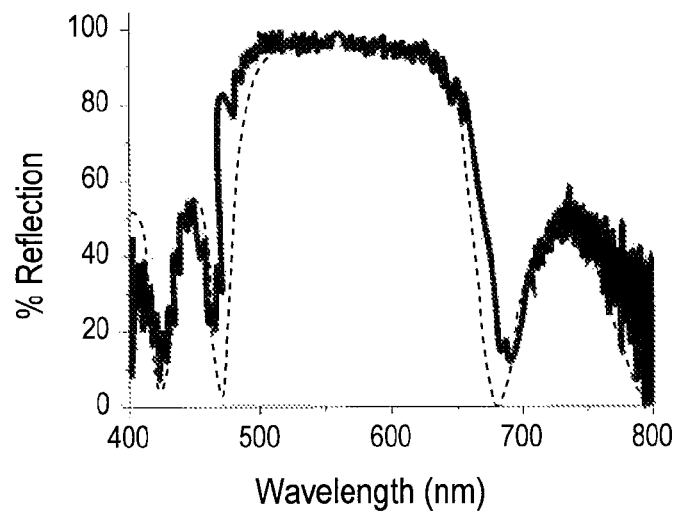
FIG. 4C
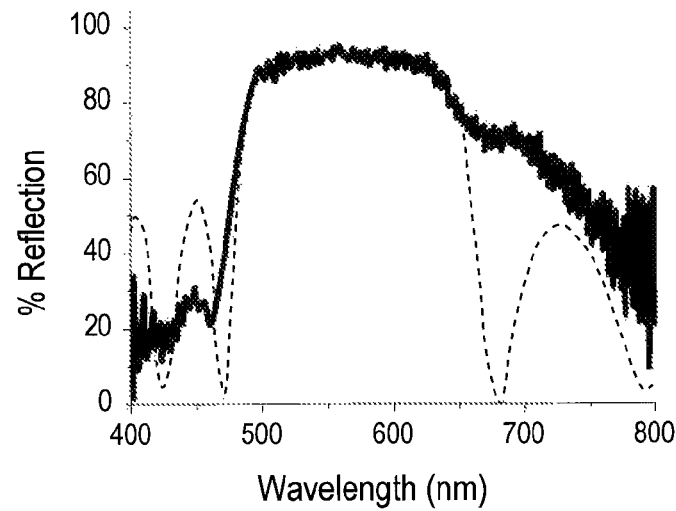
FIG. 4D

PHOTONIC DEVICES ON PLANAR AND CURVED SUBSTRATES AND METHODS FOR FABRICATION THEREOF

CROSS-REFERENCE TO RELATED APPLICATIONS

This application claims priority to and the benefit of PCT Application No. PCT/US2012/067131, filed Nov. 29, 2012, entitled "PHOTONIC DEVICES ON PLANAR AND CURVED SUBSTRATES AND METHODS FOR FABRICATION THEREOF", which claims the benefit of and priority to U.S. Provisional Application No. 61/565,801, filed Dec. 1, 2011, entitled "PHOTONIC DEVICES ON PLANAR AND CURVED SUBSTRATES AND METHODS FOR FABRICATION THEREOF", which are incorporated herein in their entirety.

STATEMENT OF GOVERNMENT INTEREST

This invention was made with government support under Award No. ECS 0609244 awarded by the National Science Foundation and under contract No. DE-EE0002768 awarded by the U.S. Department of Energy. The United States government has certain rights in the invention.

BACKGROUND

Sol-gel chemistry has emerged as an attractive—simple, rapid and inexpensive—alternative synthesis route to physical and chemical deposition methods. The relatively mild synthesis conditions and flexibility of sol-gel chemistry have opened the door to a large variety of compounds that can be processed into thin films, fibers, and monoliths. In addition, when combined with molecular and/or colloidal assembly methods, it is possible to create composites with internal three-dimensional meso-to-macroscale periodic features and other hierarchical structures. This large diversity of accessible compositions, morphologies and internal structures makes sol-gel chemistry-derived materials attractive candidates for numerous applications ranging from catalysis, separation and sorption to uses in electronics and photonics.

A remaining challenge for widespread commercial applications is to produce sol-gel-derived materials with structural uniformity over large sample areas (e.g., $>cm^2$) and controlled batch-to-batch reproducibility. This is particularly true for thin-film based materials and applications. Here, the level of uniformity and control over thin-film parameters has been set very high by physical and chemical deposition methods, such as atomic layer deposition, chemical vapor deposition, molecular beam epitaxy and various sputtering techniques. Therefore, for sol-gel processing to be considered a viable fabrication alternative for commercial applications, similar standards have to be achieved. The two foremost challenges in sol-gel fabrication of thin films are the avoidance of crack formation and the achievement of a uniform and reproducible film thickness over large areas. Both of these problems are directly related to solvent evaporation during deposition of thin films (dip or spin coating, casting) and their densification in subsequent heat treatments (calcination, annealing). Conducting the thin film deposition process under controlled environmental conditions (for example, a dedicated clean room with controlled humidity, temperature, substrate pre-treatment, absence of dust particles in air) can help to significantly increase the film quality. However, despite these advances, sol-gel derived thin films are still prone to irregularities in film thickness (edge effects), and shrinkage and crack-formation during heat treatment.

Among the large family of interesting thin film compounds the wide bandgap semiconductor titania has recently gained tremendous attention due to its outstanding chemical and physical properties. While high chemical stability and catalytic activity make titania a prime candidate for photoanodes in solar cells and water-splitting, its high refractive index combined with optical transparency in the visible range of the electromagnetic spectrum are ideal for producing reflective coatings and other optical components. Furthermore, by depositing titania thin films alternatingly in stack-form with a lower refractive index compound such as silica, interesting one-dimensional (1D) photonic bandgap materials can be fabricated, including reflectors, filters, and microcavities. Such layering of thin films of different compounds with different thermal expansion coefficients, however, poses a big challenge for sol-gel fabrication. During film processing and thermal treatments, different shrinkage properties within alternating layers and at interfaces induces stresses and can lead to severe crack formation, delamination, and variation in the film thicknesses.

A strategy for minimizing crack formation in titania/silica thin-film stacks is the firing process. This is an additional short heat-treatment step at high temperatures (900-1000° C.). The purpose of this firing process is to take advantage of the opposing thin film stresses for silica and titania at 900° C. While, studies by Rabaste et al. and Kozuka et al. revealed an induced tensile stress for both silica and titania thin films up to 800° C., increasing the temperature to 900° C. resulted in a compressive stress for silica. It is argued that these opposing stresses result in an overall relaxed multi-stack and reduces the formation of cracks. Contrasting this high-temperature approach, Keszler et al. reported a low-temperature (5° C.) solution-processing method followed by an annealing step at modest temperatures (300° C.). This method allows for the deposition of dense titania thin films. However, in this method the deposition thickness is limited to ~18 nm for each deposition cycle. To create alternating stack structures with each layer having a thickness of several tens to hundreds of nanometer thickness (as required for application as photonic band gap materials operating in the visible or near infrared range), this method would require deposition of multiple consecutive films of the same compound.

BRIEF SUMMARY

The present disclosure describes photonic devices that can be fabricated on planar and non-planar (e.g., convex or concave) substrates and methods for fabrication thereof. The methods described herein include versatile, simple, rapid and inexpensive sol-gel techniques for the fabrication of high-quality large area single and/or multi-layer thin film materials. The photonic devices described herein are fabricated by depositing a layer (e.g., by dip-coating, spin-coating, spray-coating, or drop-casting) of a sol-gel solution onto a substrate to form a single sol-gel layer having a thickness in a range of about 50 nm to about 500 nm. Various substrate types may be used (e.g., silicon, glass, quartz, etc.) and the substrates may have various configuration (e.g., planar surfaces or non-planar surfaces with concave or convex geometries). The deposition is followed by a heat-treatment procedure to solidify the deposited dielectric compounds and, optionally, to induce crystallization (e.g., crystalline anatase, brookite, or rutile titanium dioxide). The described devices may be composed of single or multiple layers of a single material or, in the case of multi-layer structures, multiple alternating layers of two or more materials (e.g., alternating layers of titanium dioxide and silicon dioxide).

In an embodiment, a sol-gel method for forming a material layer on a substrate is described. The method includes (1) depositing a layer of a sol-gel material onto at least a portion of the substrate to produce a coated substrate. The sol-gel material includes a dispersed solid phase (e.g., a silica or titania precursor material) and a solvent (e.g., water, ethanol, and HCl). In one embodiment, the method may include holding the substrate at a substantially constant humidity and/or solvent vapor pressure during the deposition process. The method further includes (2) evaporating the solvent from the sol-gel material deposited onto the substrate by exposing the deposited layer of sol-gel material to a hot air stream, (3) calcining the substrate with the deposited layer of sol-gel material at a temperature of about 250° C. to about 500° C. for about 1 second to about 1 hour, and (4) cooling the calcined substrate from the calcining temperature to about room-temperature or less in about 3 seconds to yield the material layer on the substrate. However, with respect to the cooling time, one will appreciate that the time needed to cool the calcined substrate and the layers applied thereon from the calcining temperature to about room-temperature or less is at least partially a function of the calcining temperature, the thickness of the deposited film(s), and the thickness of the substrate.

In one embodiment, the method may further include depositing a second layer of sol-gel material on to the substrate after calcining and cooling the first layer, and performing the evaporating, calcining, and cooling steps on the substrate coated with the additional second layer to yield a substrate having first and second material layers deposited thereon. In one embodiment, the sol-gel material used to deposit the second layer may be the same as or different than the sol-gel material used to form the first layer. In one embodiment, the method may further include forming multiple, alternating first and second material layers on the substrate.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which:

FIGS. 2A and 2B illustrate samples fabricated including (A) and omitting (B) the dry-blowing step in the deposition cycle illustrated in FIG. 1. FIGS. 2C and 2D illustrate samples fabricated including (C) and omitting (D) the shock-cooling step in the deposition cycle illustrated in FIG. 1.

FIGS. 3A-3C illustrate (A) a photograph and (B) a cross-sectional SEM image of a thin-film Bragg stack consisting of 14 alternating layers of silica (88±2 nm; dark layers) and titania (75±2 nm; bright layers) deposited onto a silicon (100) wafer. FIG. 3C illustrates a corresponding optical reflection spectrum (solid line) and simulated spectrum (dotted line) for the thin-film Bragg stack illustrated in FIGS. 3A and 3B.

FIGS. 4A-4D. FIGS. 4A and 4B illustrate photographs of thin-film Bragg stacks consisting of 12 alternating layers of silica (88±2 nm; dark layers) and titania (75±2 nm; bright layers) deposited onto (A) a planar borosilicate glass substrate and (B) a curved quartz-glass substrate. FIGS. 4C and 4D illustrate corresponding optical reflection spectra (solid lines) of the stacks on (C) a planar borosilicate glass substrate and (D) a curved quartz-glass substrate—simulated spectra are given as dotted lines.

FIG. 6A illustrates a TEM image of a nanoporous titania thin-film sample. Some of the pores are indicated by arrows. FIG. 6B illustrates optical reflection spectra of three 14-layer silica/titania Bragg stacks with differing refractive indices of the titania layer deposited onto a silicon (100) substrate. The titania layer refractive indices ("n") are 2.34±0.02, 2.1±0.1, and 1.8±0.1.

DETAILED DESCRIPTION

Figure 1:
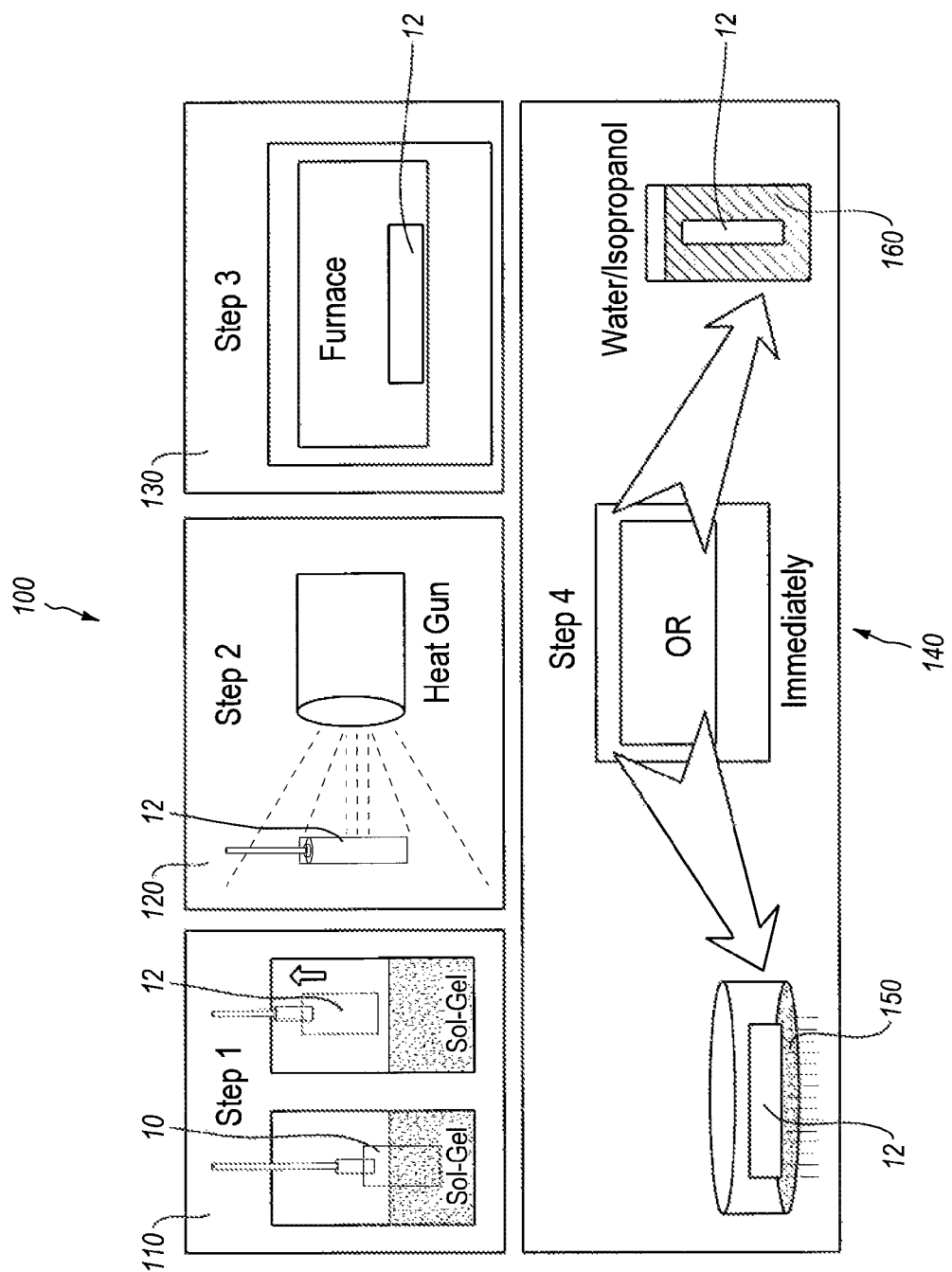
FIG. 1 is a flow diagram illustrating a deposition cycle for fabrication of sol-gel thin-film layers: Step 1: dip-coating; step 2: dry-blowing; step 3: heat-treatment (annealing); and step 4: shock-cooling.

The present disclosure describes photonic devices that can be fabricated on planar and non-planar (e.g., convex or concave) substrates and methods for fabrication thereof. The methods described herein include versatile, simple, rapid and inexpensive sol-gel techniques for the fabrication of high-quality large area single and/or multi-layer thin film materials. The photonic devices described herein are fabricated by depositing a layer (e.g., by dip-coating, spin-coating, spray-coating, or drop-casting) of a sol-gel solution onto a substrate to form a single sol-gel layer having a thickness in a range of about 50 nm to about 500 nm. Various substrate types may be used (e.g., silicon, glass, quartz, etc.) and the substrates may have various configuration (e.g., planar surfaces or non-planar surfaces with concave or convex geometries). The deposition is followed by a heat-treatment procedure to solidify the deposited dielectric compounds and, optionally, to induce crystallization (e.g., crystalline anatase, brookite, or rutile titanium dioxide). The described devices may be composed of single or multiple layers of a single material or, in the case of multi-layer structures, multiple alternating layers of two or more materials (e.g., alternating layers of titanium dioxide and silicon dioxide).

In an embodiment, a sol-gel method for forming a material layer on a substrate is described. The method includes (1) depositing a layer of a sol-gel material onto at least a portion of the substrate to produce a coated substrate. The sol-gel material includes a dispersed solid phase (e.g., a silica or titania precursor material such as tetraethyl orthosilicate ("TEOS") or titanium(IV)isopropoxide) and a solvent (e.g., water, ethanol, and HCl). In one embodiment, the method may include holding the substrate at a substantially constant humidity and/or solvent vapor pressure during the deposition process. The method further includes (2) evaporating the solvent from the sol-gel material deposited onto the substrate by exposing the deposited layer of sol-gel material to a hot air stream, (3) calcining the substrate with the deposited layer of sol-gel material at a temperature of about 250° C. to about 500° C. for about 1 second to about 1 hour, and (4) cooling the calcined substrate from the calcining temperature to about room-temperature or less in about 3 seconds to yield the material layer on the substrate. However, with respect to the cooling time, one will appreciate that the time needed to cool the calcined substrate and the layers applied thereon from the calcining temperature to about room-temperature or less is at least partially a function of the calcining temperature, the thickness of the deposited film(s), and the thickness of the substrate.

In one embodiment, the method may further include depositing a second layer of sol-gel material onto the substrate after calcining and cooling the first layer, and performing the evaporating, calcining, and cooling steps on the substrate coated with the first and second layers to yield a substrate having first and second material layers deposited thereon. In one embodiment, the sol-gel material used to deposit the second layer may be the same as or different than the sol-gel material used to form the first layer. In one embodiment, the method may further include forming multiple, alternating first and second material layers on the substrate.

In one embodiment, the first material layer comprises silicon dioxide ("$SiO_2$") and the second material layer comprises titanium dioxide ("$TiO_2$"). In additional embodiments, the first and/or the second layer may be formed from one or more metal oxides of vanadium, molybdenum, tungsten, niobium, titanium, cerium, silicon, iridium, nickel, copper, or zinc. In one embodiment, metal oxides of various oxidation states may be used. Suitable examples of metal oxides and their oxidation states include, but are not limited to, vanadium oxide (II/III/IV/V); molybdenum oxide (VI); tungsten oxide (VI); niobium oxide (V); titanium oxide (II/IV); cerium oxide (III/IV); silicon oxide (IV); iridium oxide (IV); nickel oxide (II); copper oxide (II/III), zinc oxide (II), and mixed oxides of various combinations.

In one embodiment, each of the multiple alternating first and second layers have a substantially equal thickness. In another embodiment, at least one of the multiple alternating first and second layers is substantially thicker or thinner than adjacent alternating first and second layers. In yet another embodiment, the thickness of the layers of the first or second material may be held essentially constant while the thickness of the layers of the other material may be varied. Using such deposition techniques, devices such a 1D photonic crystals, a Bragg mirrors, interferometers, and the like may be formed.

In one embodiment, the deposited layer of sol-gel material may have a thickness in a range of about 10 to about 1000 nm (e.g., about 50 nm to about 500 nm), about 100 nm to about 500 nm, about 100 to about 400 nm, or about 100 to about 200 nm, and combinations of the recited lower and upper numbers.

The sol-gel solution may be deposited by various techniques. For example, suitable techniques for depositing the sol-gel solution include, but are not limited to, dip coating, spin coating, spray coating, or drop casting. Spin coating is well suited for making thinner layers (e.g., about 10 nm), drop casting is well suited to making thicker layers (e.g., up to about 1000 nm), and dip coating is well suited to making layers having intermediate thicknesses.

In one embodiment of the method described herein, the depositing includes: dipping the substrate into a dipping chamber containing a sol-gel solution, and withdrawing the substrate from the dipping chamber at a predetermined rate to deposit the first layer of the sol-gel material onto the substrate. The predetermined rate of withdrawing the substrate from the dipping chamber is selected to deposit a first layer of sol-gel material onto the substrate having a selected thickness. The selected thickness of the first layer of sol-gel material deposited onto the substrate is affected by at least one of a viscosity of the sol-gel solution or the predetermined rate of withdrawing the substrate from the dipping chamber.

In one embodiment, the substrate is withdrawn from the dipping chamber at a substantially constant rate ranging from about 1 cm/min to about 20 cm/min (e.g., about 5 cm/min to about 15 cm/min). However, one will appreciate that the predetermined rate of withdrawal from the dipping chamber may be varied depending on the type of sol-gel material, the characteristics of the sol-gel material (e.g., the viscosity of the sol-gel), the application for which the coated substrate is intended, the intended thickness of the deposited layer, and the like.

In one embodiment, the substrate is enclosed in a dip chamber while dipping and withdrawing. In one embodiment, the substrate is exposed to substantially constant humidity and/or solvent vapor pressure during the dipping and withdrawing.

According to various embodiments of the present disclosure, the substrate may have a number of configurations. For example, the substrate may be substantially planar or substantially non-planar. Examples of non-planar substrates include, but are not limited to, convex surfaces, concave surfaces, cylinders, and the like.

In one embodiment, the method may further include adding a surfactant or another organic compound to the sol-gel material used to form either the first layer or the second layer, and forming at least two alternating first and second material layers on the substrate. In one embodiment, the surfactant or the other organic compound induces mesoporosity in the layer formed from the sol-gel material that includes the surfactant or the other organic compound.

The inventors have found that holding the substrate at a substantially constant humidity and/or solvent vapor pressure during the deposition process and rapidly evaporating the solvent from the sol-gel material deposited onto the substrate helps to suppress so-called edge effects and crack propagation. Suppression of edge effects allows for greater uniformity across individual layers and leads to greater layer-to-layer uniformity in multi-layer devices. Similarly, suppression of crack formation allows for the formation of thicker individual layers, which greatly increases the speed and ease of fabrication of multi-layer reflectors and interferometers that operate in the visual spectrum.

For example, during the deposition inhomogeneous solvent evaporation from the sol-gel material can create a vapor pressure gradient that can cause a differential shrinkage of the thin film network in which the exterior of the network shrinks faster than the interior. The differential shrinkage of the deposited sol-gel material leads to tensile stresses that can fracture the thin film upon evaporation. The inventors have found that such crack propagating forces can be suppressed by holding the substrate at essentially constant humidity and/or solvent vapor pressure during the process of depositing the sol-gel film on the substrate. Following deposition, the deposited sol-gel layer may be immediately subjected to a hot air stream from, for example, a blowing heat gun. The constant high humidity and/or solvent vapor pressure present during deposition and the succeeding dry-blowing step counteract the differential shrinkage of the deposited sol-gel film due to a forced homogenous solvent evaporation process.

The methods described herein further suppress crack formation by employing a rapid cool down step following calcining (e.g., cooling the calcined substrate from the calcining temperature to about room-temperature or less in about 2 seconds). The rapid cooling step can be accomplished, for example, by bringing the substrate into contact with a heat sink or by immersing the substrate into a cold liquid (e.g., a water alcohol mix). Without being tied to one theory, it is believed that this rapid cooling step may counter crack formation by "fixing" the layers and by not allowing time for different rates of thermal expansion/contraction within each layer and between the substrate and the layer(s) to initiate crack formation.

In one embodiment, the cooling includes at least one of contacting the coated and calcined substrate with a heat-sink or immersing the coated and calcined substrate in a volume of liquid.

In one embodiment, the sol-gel material may be formed from one or more metal oxides of vanadium, molybdenum, tungsten, niobium, titanium, cerium, silicon, iridium, nickel, copper, or zinc. In one embodiment, metal oxides of various oxidation states may be used. Example of metal oxides and their oxidation states include, but are not limited to, vanadium oxide (II/III/IV/V); molybdenum oxide (VI); tungsten oxide (VI); niobium oxide (V); titanium oxide (II/IV); cerium oxide (III/IV); silicon oxide (IV); iridium oxide (IV); nickel oxide (II); copper oxide (II/III), zinc oxide (II), and mixed oxides of various combinations.

Example applications for individual films include, but are not limited to, thermochromic films and electrodes in batteries (vanadium oxides), photochromic and electrochromic films (molybdenum oxides), electrochromic films (tungsten oxides), electrodes in batteries (niobium oxides), optical filters and reflectors, anti-reflective coatings and solar cell applications (titanium oxides), anti-reflective coatings and electrodes in batteries (cerium oxides), optical coatings (silicon oxides), anti-reflective coatings and solar cell applications (iridium oxides), electrochromic films (nickel oxides), electrodes (copper oxides) and optical filters and reflectors, anti-reflective coatings and solar cell applications (zinc oxides). Depending on the desired optical characteristics and the intended application of the device, the materials described herein can also be used in alternating layer applications.

The versatility of the methods described herein is demonstrated by the fabrication of high-quality (e.g., crack free, variable thickness, large area, smooth surface) single or multi-layer structures (e.g., exceeding 30 alternating single layers) of alternating dielectric compounds (e.g., titanium dioxide and silicon dioxide). In addition, the dielectric properties (dielectric constant or refractive index) of the layers may be tuned by incorporating air-pore structures into the thin films (mesoporosity); the degree of mesoporosity can be adjusted by the air-pore structure and size and can range from only a few percent to up to more than 90 percent.

Due to the ability to deposit relatively thick layers of material without edge effects and cracking and modest calcination temperatures of about 250° C. to about 500° C., high quality sol-gel multi-layer films/stacks were successfully and repeatedly deposited onto planar substrates, curved substrates with both concave and convex surfaces and on substrates that are usually not suitable for high temperature methods (such as borosilicate glass). The methods described herein further allow for the deposition of crack-free single and multi-layer thin films over large areas and therefore has the ability to be used/integrated in typical semiconductor micro-processing fabrication. For example, standard silicon wafers range from about 25 mm to about 250 mm in diameter; 300 mm and 450 mm wafers are not unknown.

As an example for an application of samples fabricated by the disclosed methods, it is shown that the exceptional high optical quality obtained by the present methods allows for the fabrication of large area multi-layer stacks that act as excellent one-dimensional photonic bandgap materials (e.g., 1D photonic crystals or Bragg mirrors). Tuning the sol-gel parameters enables the disclosed methods to predictably control the thickness, composition, and refractive index of each layer of the multi-layer photonic crystal independently. This results in photonic crystals with adjustable bandgap positions throughout the near infrared and visible range of the electromagnetic spectrum and independently adjustable bandgap widths (through controlling the difference in the refractive index of the alternating layers by introducing mesoporosity). In addition, by systematically breaking the symmetry of the alternating layer stack, optical cavity modes can be introduced to form an interferometer, such as a Fabry-Perot interferometer. This can be achieved by either breaking the symmetry at the center layer of the stack (e.g., a thick layer is placed at the center of the stack) to create a localized optical microcavity, or by gradually decreasing (or increasing) the layer thickness from the outside of the stack to its center position to create delocalized optical cavity modes.

Examples

In these Examples, a sol-gel approach for the rapid fabrication of high quality silica and titania thin films and alternating silica/titania stack structures is described. These methods allow deposition of these thin film and multi-layer structures on planar and curved structures without loss of film quality. Regardless of stack structure, layer numbers and type of substrate, the materials fabricated by these methods have predictable uniform thickness and are crack-free over large areas. The versatility of this sol-gel method is demonstrated by engineering different 1D photonic bandgap materials on planar and curved substrates, including high quality Bragg reflectors and filters, Fabry-Perot microcavities, and asymmetric stacks. The inventors show that the photonic properties of these structures can be readily tuned by controlling the thickness and sequence of the deposited films as well as by tailoring the refractive indices of individual layers through the introduction of nanoporosity (i.e., mesoporosity). Presented herein is a discussion of the important steps of this sol-gel deposition and processing method. Likewise, several new process parameters found to be important for successfully producing crack-free multi-layer structures with uniform thickness are introduced. These parameters include controlled solvent evaporation during and after the film deposition and a shock-cooling step immediately following the thermal annealing process at 350-500° C. The fabrication steps and the final samples were characterized by scanning electron microscopy (SEM), transmission electron microscopy (TEM), variable-angle ellipsometry measurements, X-ray diffraction (XRD), and optical reflection spectroscopy.

The measured optical reflection spectra are further compared to simulated spectra using the transfer-matrix method.

Preparation of Precursor Solutions.

The titania precursor solution was prepared by mixing 60 mL titanium(IV)isopropoxide (Acros) and 65 mL ethanol under vigorous stirring for 30 minutes (exothermic reaction). A solution of 124 mL ethanol, 0.6 mL hydrochloric acid (12 M) and 1.15 mL of deionized water (DI water) was then added to the titania solution and stirred for an additional 30 minutes. This mixture was aged for at least 48 hours at room temperature before further use. The silica precursor solution was prepared by adding 105 mL tetraethylorthosilicate (Aldrich) to a mixture of 12.3 mL DI water, 76 mL ethanol and 6.3 mL HCl (0.01 M) and mixing for 30 minutes at room temperature. This solution was aged for at least 48 hours at 60° C. before further use.

Deposition of Thin-Film Single and Multi-Layer Structures.

FIG. 1 illustrates a four-step thin-film deposition cycle 100. Thin films were deposited by dip-coating 110 sol-gel precursor solutions onto a substrate 10. Prior to dip-coating 110, the substrate 10 was cleaned by rinsing with isopropanol and drying in a stream of nitrogen. Substrates 10 were immersed into the sol (titania or silica precursor solution) and vertically withdrawn at a constant speed of 12.5 cm/minute 110 (step 1). The dip-coating process 110 was immediately followed by heating the coated substrate 12 in a flowing stream of hot air (e.g., at about 100-200° C.; produced by a heat gun) for rapid evaporation of volatile solvents 120 (step 2). The dried coated substrate 12 was further heat-treated (i.e., calcined) in step 130 for 1 minute at 350-500° C. in a muffle furnace (step 3). The final step of the thin-film deposition cycle was a shock-cooling procedure (step 4). This was accomplished by taking the coated substrate 12 out of the hot furnace and either placing it onto a Pyrex glass substrate or a metal substrate (i.e., a heat sink) at room temperature 150, or dipping it into a water/isopropanol mixture 160. The selection of the cooling method depends on the geometry of the substrate and the heat transfer ratio between the substrate and the heat sink. While the former method was sufficient to promote rapid cooling for thin films deposited onto thin silicon wafer substrates, the latter method was advantageous for curved substrates and substrates made of thick silicon wafers and quartz or glass slides. Titania or silica single-compound multi-layers and alternating titania/silica multi-layer stacks were prepared by repeating this cycle 100 using the appropriate sols at each cycle. If high crystallinity of the titania layers is desired, a final heat-treatment (not shown) of the multi-layer structures at 400-500° C. for 1 hour may conclude the deposition process.

Fabrication of Bragg Stacks and Fabry-Perot Microcavities.

Bragg stacks (reflectors, filters) were fabricated by deposition of at least 6 alternating silica/titania double-layers (12 layers in total). The thickness of each layer was controlled by either diluting the precursor solutions with additional ethanol or by varying the dip-coating speed, allowing for tuning the optical band gap in the visible range as discussed further in the Results and Discussion section. For example, to fabricate a silica layer with a thickness of 88±2 nm the original silica stock solution was diluted down to 25 volume percent of its original volume. The fabrication of 80±2 nm titania layer requires a 10 volume percent dilution of the stock solution with ethanol. Fabry-Perot optical microcavities were fabricated by breaking the symmetry of a Bragg stack, i.e., introduction of a "defect layer". This was accomplished by subsequently depositing two layers of the same compound. The wavelength position and quality of the microcavity mode was tuned by adjusting the thickness and dielectric properties of the defect layer with respect to the multilayer stack.

Refractive Index Tuning.

The effective film refractive index was tuned by introducing a certain degree of nanoporosity into a deposited dielectric layer. This was achieved by dissolving various amounts of the block copolymer surfactant Pluronic® P123 in the sol prior to dip-coating. For example, to lower the refractive index of a titania layer, between 0.1 and 0.5 g of P123 was dissolved in the titania precursor solution (described above). To compensate for changes of the solution viscosity due to the addition of surfactants, the dip-coating speed was adjusted to keep the thickness of the deposited layers constant. Heat-treatment of the samples caused the pyrolitic removal of the surfactant molecules and formation of a disordered nanoporous framework. This framework was then infiltrated during the succeeding deposition cycle by the alternating precursor solution (e.g. silica), resulting in a lowered effective refractive index from pure titania to that of a titania/silica composite.

Characterization Studies.

The film crystallinity was determined by a Bruker D8 Advanced X-Ray Diffractometer (Cu-K$\alpha$ radiation). The refractive index and thickness of thin films were measured with a Woolam Variable Angle Spectroscopic Ellipsometer. SEM studies were conducted on a FEI NovaNano (FEG-SEM630) microscope and a FEI NovaNano (FEI DB237) focused ion beam microscope. TEM imaging was done on a FEI Tecnai F30 microscope at 300 kV acceleration voltage. Sample preparation for TEM measurements involved scratching off the deposited thin film from the Si-wafer substrate with a sharp razor blade. The sample was then suspended in ethanol and dispersed onto a copper TEM sample holder. Sample preparation for SEM measurements involved splitting the thin film substrate perpendicular to the deposited thin film stack and mounting the exposed cross section of the sample on a vertical SEM specimen stub. If necessary the mounted specimen was coated with a thin layer of gold to minimize charging effects during SEM studies.

Optical Reflection Microscopy and Spectroscopy.

Optical reflection spectra were measured with a modified optical microscope (Nikon ME600). The output of a broadband white light source was focused onto the sample surface by a 20× objective (0.45 NA). The reflected light was collected by the same objective and either imaged by a CCD camera or fiber-coupled into an Ocean Optics USB-4000 UV-VIS spectrometer. A broadband mirror (R>0.96) was used as reference.

Simulation of Optical Reflection Spectra.

Optical reflection spectra were simulated by the transfer-matrix method using OpenFilters. OpenFilters is an open-source software with a build-in graphical interface and is available at no charge under the GNU General Public License.

Results and Discussion

Single and Multi-Layer Sol-Gel Dip-Coating Process

The dominating challenge in fabricating high-quality thin film single and multi-layer structures is the suppression of crack formation. Crack formation is the result of stresses occurring during and after the deposition process that exceed the thin film strength. For inorganic thin films derived by sol-gel chemistry cracks can form at multiple processing stages. The inventors designed a sol-gel dip-coating method selected to address these challenges at the three most important processing stages: the initial film drying, the pre-annealing step, and the annealing (heat treatment) process. The major steps of this process for fabricating highly reproducible, large-area, crack-free single and multi-layer structures of silica and titania, as well as stacks of alternating layers of these two compounds, are schematically shown in FIG. 1.

During the drainage process which begins even as the substrate 10 in being withdrawn from the sol-gel in step 110, inhomogeneous solvent evaporation from the film on the coated substrate 12 creates a pressure gradient. The gradient causes a differential shrinkage of the thin-film network, whereby the exterior of the network shrinks faster than the interior. This leads to the build-up of tensile stresses that can fracture the thin-film upon ongoing solvent evaporation. The inventors found this problem can be overcome by designing the dip-coating process such that the freshly dipped substrate 12 is withdrawn into an environment of high solution-vapor pressure. This is achieved simply by using a tall vial that was only half-filled with the deposition solution (Step 1 shown at 110). The coated substrate 12 with the thin film of sol-gel coated thereon is subsequently subjected to a drying step 120 in a flowing hot-air stream generated by, for example, a heat gun, resulting in a rapid and homogeneous solvent evaporation. The inventors found the combination of these two steps counteracts the differential shrinkage within the deposited layer and results in formation of crack-free films. In addition, the rapid drying step 120 under a heated air stream greatly reduced the occurrence of edge effects. Edge effects in deposited thin films are a known phenomenon especially associated with dip-coating processes, and are caused by substrate vibrations and inhomogeneous solvent evaporation in the center and at the edges of deposited films during the withdrawal process.

Heat-treatment (step 3) of the coated substrate 12 is shown at 130. During heat-treatment 130 residual solvent and other organic components of the precursor solution are pyrolytically removed and the loosely formed oxide network is further densified. In the case of titania films, heat-treatment also leads to partial crystallization of the initially amorphous network. However, these reactions during heat-treatment also lead to further film shrinkage, accompanied by an increase in tensile stresses, potentially causing crack formation. On the other hand, it is known that rapid heating rates increase the viscoelasticity of the initially forming amorphous oxide network. This network relaxation counteracts the tensile stress formation and suppresses crack formation. The inventors found placing the deposited and hot-air treated films into a preheated oven at 350-500° C. for about 1 second to about 1 hour (e.g., about 1 minute) gave the best results.

Similar to the heating process the cool-down stage may be selected to create high quality films. In one embodiment, the coated substrate 12 may be cooled rapidly by placing the heat treated coated substrate 12 into contact with a heat sink 150. In another embodiment, the coated substrate 12 may be cooled rapidly by placing the heat treated coated substrate 12 into a volume of room-temperature or chilled liquid 160 (e.g., water/isopropanol). While this stage of the heat-treatment is often neglected, the inventors found it to be of particular importance for fabricating crack-free thin-film stacks composed of alternating layers of silica and titania or other materials.

Several factors are responsible for the formation of cracks during the cool-down process. One source is the difference in expansion coefficients between the alternating deposited layers as well as between the substrate and the deposited film. Another source of cracking is reorganization of the thin film metal oxide network. This reorganization is caused by phase transitions of the amorphous or amorphous/polycrystalline network upon cooling, leading to built-up of stresses that can fracture the film network. The inventors studied the cool-down process in detail and found that—similar to the heating stage—rapid cooling rates are beneficial in the prevention of crack formation. While perhaps counterintuitive, the inventors found the best results were obtained by shock-cooling the film samples to room temperature immediately following the heat treatment 130. Shock-cooling was achieved by placing the hot samples onto a Pyrex glass substrate or a metal substrate 150 at room temperature or immersing them into a water/isopropanol mixture 160 (see Experimental Section). While the exact mechanism is still under investigation, the inventors propose rapid cooling minimizes the occurrence of interfacial stresses (due the difference in thermal expansion coefficients of alternating layers). In addition, temperature quenching freezes high-temperature amorphous/polycrystalline phases, maintaining high viscoelasticity of the oxide network at room temperature.

Figure 2A:
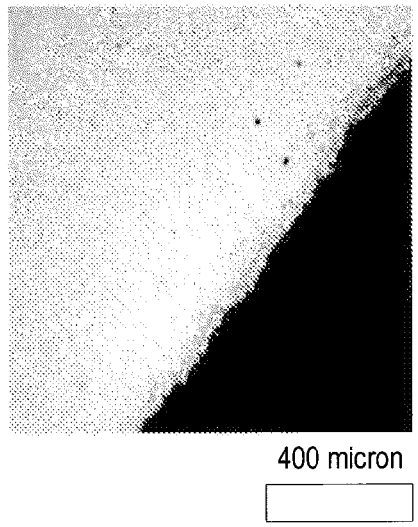
FIGS. 2A-2D illustrate optical micrographs of 12 alternating silica/titania thin-film layers deposited onto a silicon (100) wafer.
Figure 2B:
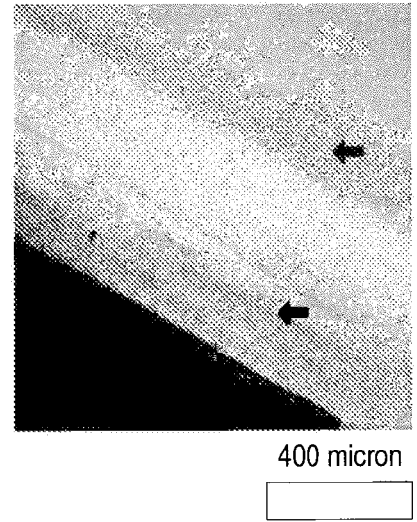
Figure 2C:
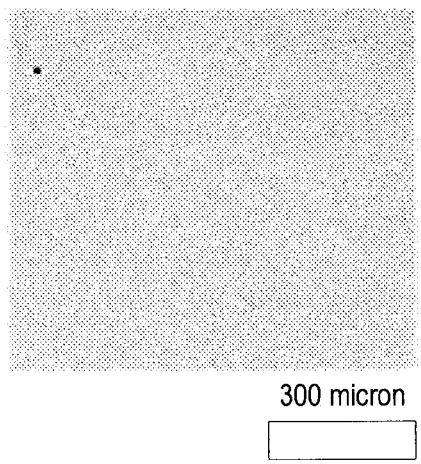
Figure 2D:
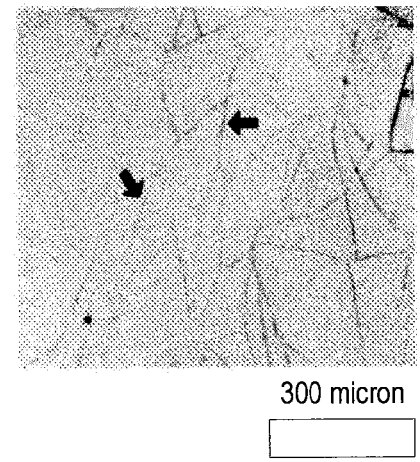

FIGS. 2A-2D illustrate optical micrographs of 12 alternating silica/titania thin-film layers deposited onto a silicon (100) wafer. FIGS. 2A and 2B illustrate samples fabricated including (A) and omitting (B) the dry-blowing step 120 in the deposition cycle 100 illustrated in FIG. 1. The thin film illustrated in FIG. 2A is substantially free of defects. In contrast, cracks and other defects in the thin film illustrated in FIG. 2B are highlighted by the arrows. FIGS. 2C and 2D illustrate samples fabricated including (C) and omitting (D) the shock-cooling step (150 or 160) in the deposition cycle 100 illustrated in FIG. 1. The thin film illustrated in FIG. 2C is substantially free of defects. In contrast, cracks and other defects in the thin film illustrated in FIG. 2D are highlighted by the arrows.

Deposition of Bragg Stacks on Various Substrates

To demonstrate the effectiveness of this sol-gel process in fabricating high-quality multi-layer structures the inventors fabricated a Bragg stack of seven alternating silica/titania layers (14 layers in total). The Bragg stack was fabricated on a silicon wafer substrate using the thin film deposition cycle described above (FIG. 3A). The Bragg stack may, for example, be fabricated on the (100) crystalline face of the wafer. However, the crystalline face has no influence on the quality of the Bragg stack and, as such, the Bragg stack may be applied to any silicon crystal lattice face of a wafer. The deposition parameters were tuned to yield layer thicknesses of 88±2 nm (silica) and 75±2 nm (titania) after calcination at 500° C. At this temperature the titania network predominantly forms an anatase polycrystalline phase, as was confirmed by XRD measurements. The structural features of the Bragg stack were examined by optical and electron microscopy. While optical imaging revealed a smooth surface and absence of even micro-cracks, cross-sectional SEM imaging verified the high degree of thickness uniformity throughout the multilayer stack (FIG. 3B).

Figure 3C:
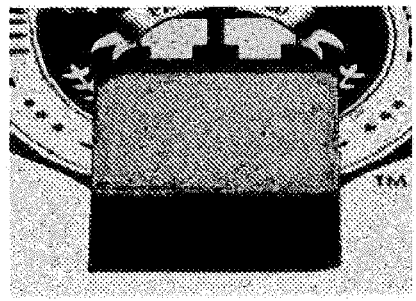
Figure 3C:
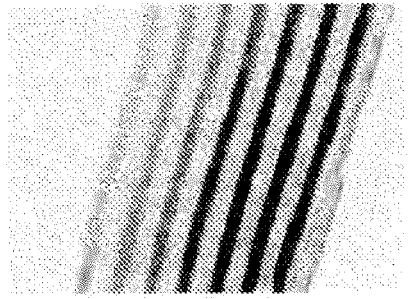
Figure 3C:
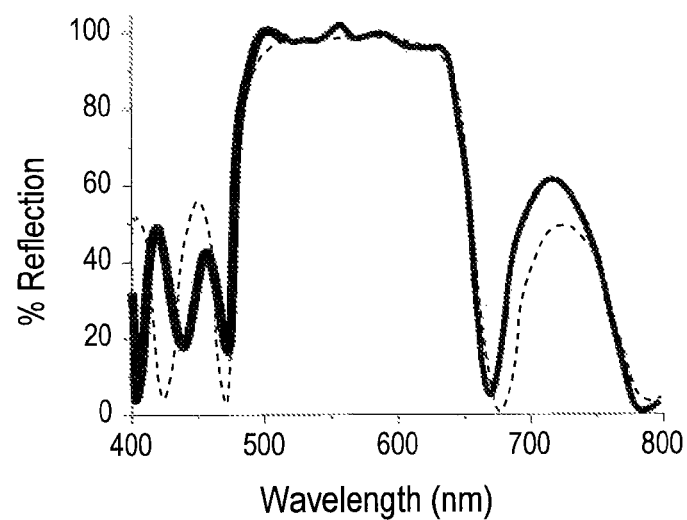

The excellent structural uniformity is also reflected in the optical properties of the Bragg stacks, acting as 1D photonic band gap materials. As expected for a high-quality 1D photonic band gap structure, this 14-layer sample displayed an optical reflection peak with a broad wavelength range of 100 percent reflectivity (FIG. 3C). In general, the inventors found six to seven alternating double-layers are necessary to achieve a band gap with 100 percent reflectivity in the visible range of the electromagnetic spectrum. For the 88/75 nm silica/titania Bragg stack the inventors measured a broad reflection band centered at a wavelength position of 575 nm and a width of 6200 cm$^{-1}$ (around 200 nm) at normal incidence. Importantly, the measured reflection data are in excellent agreement with the calculated reflection spectrum (dotted line in FIG. 3C). For the calculation the inventors used the film thickness (SEM imaging), the number of layers, and the refractive index of each layer (determined by ellipsometry) as input parameters.

It should be emphasized that this sol-gel deposition method can be applied to a number of different substrates. For example, to produce optical filters the inventors used quartz or borosilicate glass substrates (FIG. 4A). Optical characterization reveals almost identical reflection features, confirming the high optical quality of the samples regardless of the substrate (FIG. 4B). Note that borosilicate substrates, for example, would be incompatible with often-used high-temperature (900-1000° C.) firing methods. The versatility of this sol-gel method is further demonstrated by depositing the same Bragg stacks onto curved quartz and glass substrates. As shown in FIGS. 4C and 4D, also samples deposited onto curved substrates show excellent optical properties and are interesting candidates for parabolic high-power laser mirrors and solar radiation collectors. For all samples, the calculated reflection spectra are also included (dotted lines), demonstrating again the good optical performance of the Bragg stacks regardless of the substrates used.

Tuning the Position and Width of the Photonic Band Gap

Figure 5:
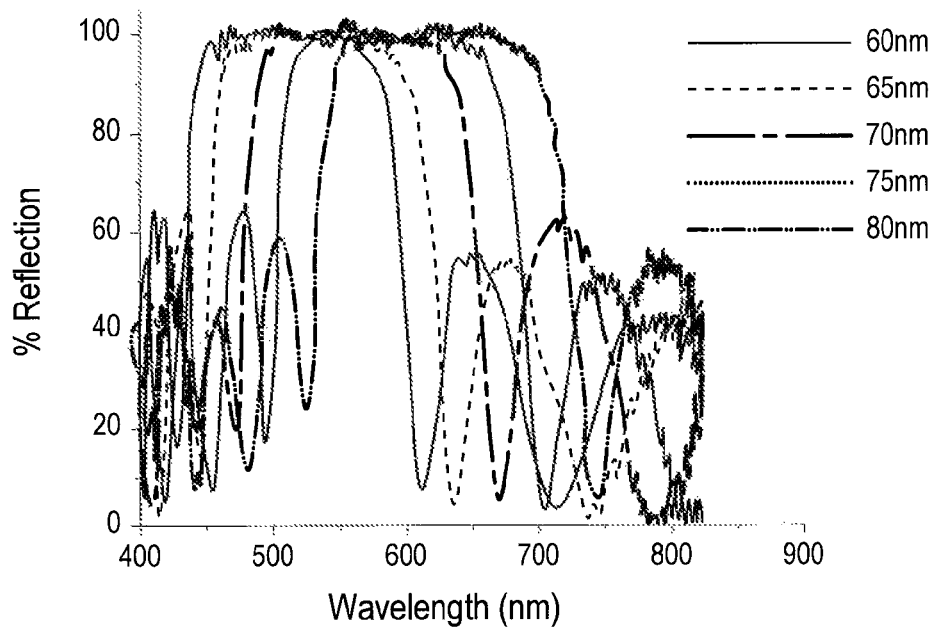
FIG. 5 illustrates optical reflection spectra of Bragg stacks of 12 alternating silica/titania layers. In the Bragg stacks, the silica layer thickness was held constant at 88±2 nm, whereas the titania layer thickness was varied between 60±2 and 80±2 nm, as indicated in the figure.

Since Bragg stacks behave as 1D photonic bandgap materials, the width and the position of the optical reflection band (bandgap) can be tuned by adjusting the refractive index difference and the thickness, respectively, of the alternating layers. The ability to tune the band gap position is demonstrated in FIG. 5. Varying the lattice constant (one silica/titania double-layer) from 148±2 nm to 168±2 nm (in 5 nm steps) shifts the reflection band throughout the entire visible range. The lattice constant variation was achieved by adjusting the titania layer thickness for each sample while keeping the silica layer thickness constant at 88±2 nm. Experimentally, this was done simply by diluting the titania precursor solution with additional ethanol while keeping the silica precursor concentration and the dip-coating parameters constant. The degree of dissolution was adjusted in response to ellipsometry measurements and SEM cross-sectional imaging. Additionally, simulations were used to verify the experimentally obtained reflection band positions and other optical features.

The width of the photonic bandgap can be tuned by modifying the difference in the refractive indices of the alternating layer; in general, the smaller the difference the narrower the gap. While the refractive indices of titania and silica obtained by this sol-gel method are fixed (2.34±0.02 for titania and 1.48±0.02 for silica), the inventors found that tuning the difference is possible by fabricating composite layers. For example, diluting the titania layers with a given amount of silica, lowers the effective refractive index from 2.34 to a value given by the silica volume fraction (dilution factor). Building a Bragg stack with silica-diluted titania layers while leaving the silica layers unchanged thus reduces the refractive index difference and should narrow the bandgap.

Figure 6A:
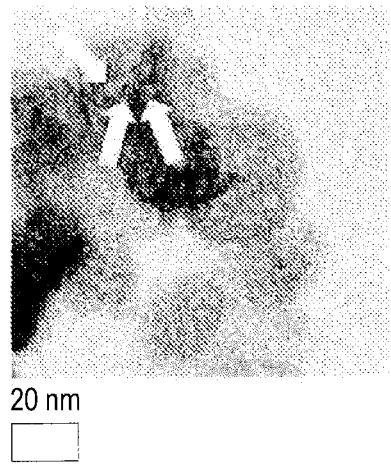
FIGS. 6A and 6B.
Figure 6B:
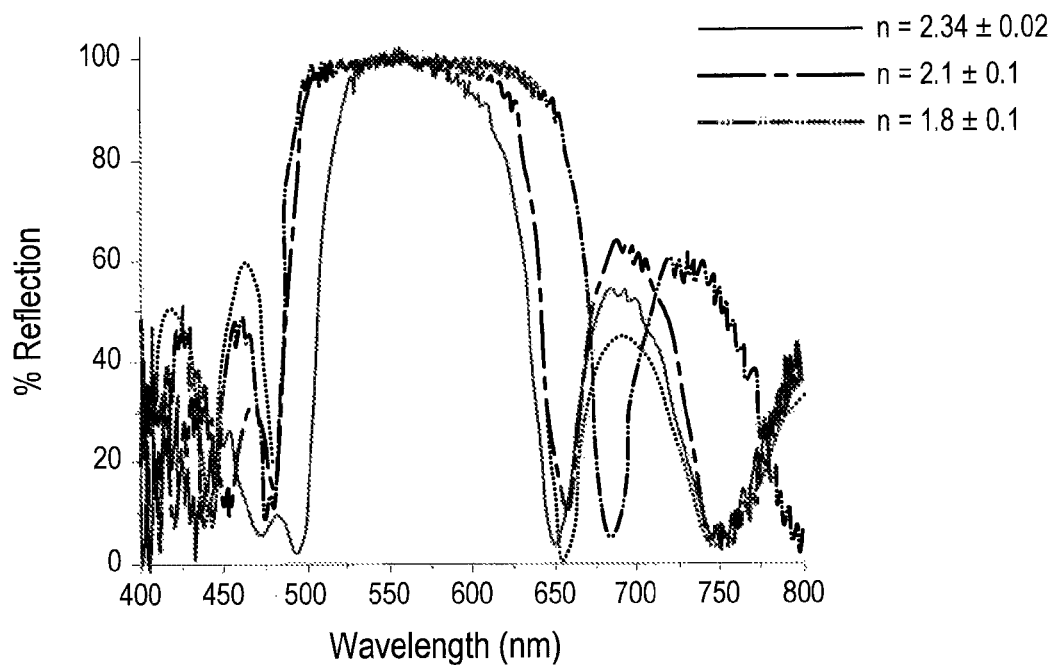

Diluting the titania layers was achieved by first adding a block copolymer surfactant (Pluronic® P123) to the titania precursor solution. After film dip-coating the organic surfactant is thermally removed during the heat-treatment, leaving behind a disordered nanoporous titania framework. A TEM image of a titania film deposited from a precursor solution containing 0.5 g P123 is shown in FIG. 6A and reveals the nanoscale porosity. During the following dip-coating step of a layer of silica, also the porous titania framework is infiltrated with the silica precursor solution. Since the degree of silica-dilution is given by the degree of porosity of the titania layer, it readily be tuned by the amount of P123 mixed into the titania precursor solution. For example, addition of 0.3 g and 0.5 g of P123 resulted in silica-titania composite layers with refractive indices of 2.1±0.1 and 1.8±0.1, respectively. These values were obtained by fitting the measured optical reflectance data to simulated spectra of Bragg stacks with known lattice constants and layer thicknesses (measured by SEM imaging). FIG. 6B illustrates the tunability of the reflection bandwidth (photonic bandgap) for three Bragg stacks with decreasing refractive index differences between the alternating layers.

Design of Optical Microcavities and Asymmetric Stacks

Figure 7A:
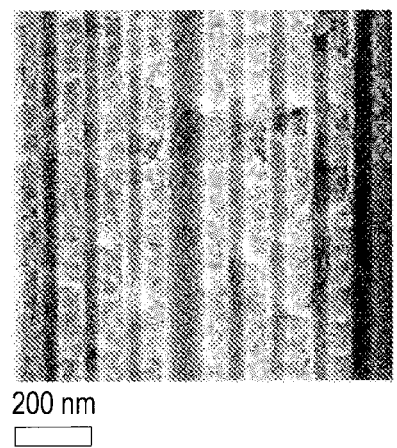
FIGS. 7A and 7B illustrate a cross-sectional SEM image (A) and (B) optical reflection spectrum of a Fabry-Perot microcavity structure deposited onto a silicon (100) substrate. The microcavity is composed of a central silica defect layer with a thickness of 176±2 nm sandwiched between two 8-layer silica/titania Bragg stacks with silica and titania thicknesses of 88±2 nm and 70±2 nm, respectively. The optical cavity mode occurs at a wavelength position of 568 nm. The simulated spectrum is given as dotted line.
Figure 7B:
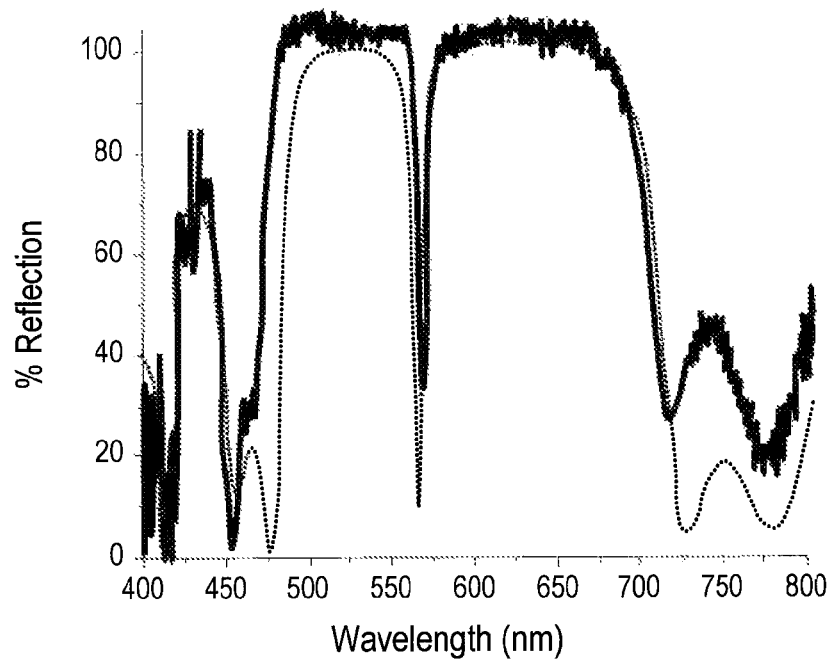

The simplicity and flexibility of this sol-gel dip-coating route readily allows to create multi-layer structures with built-in asymmetry. For example, FIG. 7A shows a cross-section SEM image of a multi-layer stack with a central "defect layer", breaking the symmetry of the periodic stack. The overall structure consists of a central silica layer with a thickness of 176±2 nm sandwiched between two Bragg stacks each composed of four silica/titania double layers with a lattice constant of 158±2 nm and individual layer thicknesses of 88±2 nm (silica) and 70±2 nm (titania). The 176 nm silica layer was fabricated simply by dip-coating two successive 88 nm silica layers. The optical reflection spectrum of the final structure is given in FIG. 7B and displays the typical characteristic of a Fabry-Perot microcavity, namely, a narrow high-transmittance region (localized optical mode) within the optical reflection band (photonic band gap). The transmission peak maximum (70 percent transmittance) is located at a wavelength position of 568 nm and has a full-width-half-maxim value, $\Delta\lambda$, of 5 nm for normal incidence of unpolarized light. This yields a quality factor, $Q=\Delta\lambda/\lambda$, of 112 for the microcavity. Similar to tuning the optical properties of Bragg stacks, the wavelength position of the localized cavity mode can be tuned by modifying the structural features (lattice constant and layer thicknesses) of the Fabry-Perot microcavity design.

Figure 8A:
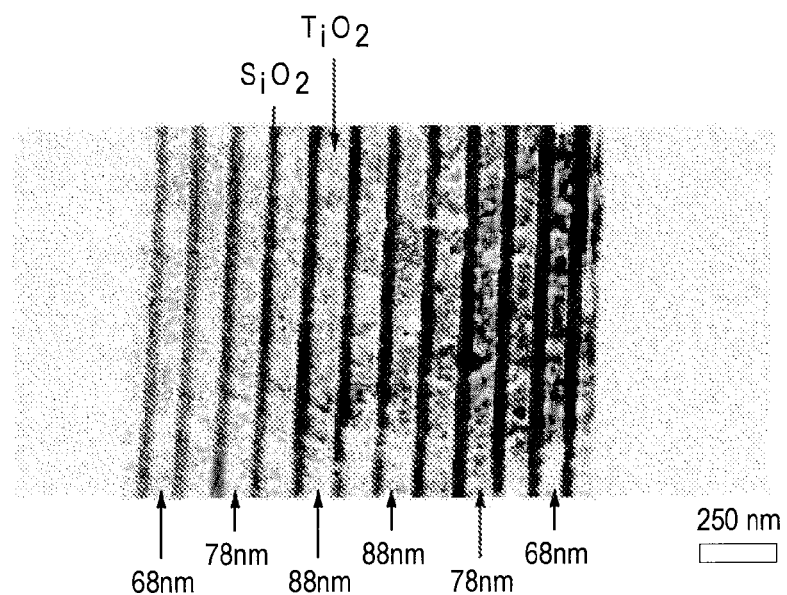
FIGS. 8A and 8B illustrate a cross-sectional SEM image and an optical reflection spectrum of an asymmetric 25-layer silica/titania Bragg stack deposited onto a silicon (100) substrate. The silica layer thickness was held constant at 44±2 nm, while the titania layer thickness was varied in 5 nm steps from 68±2 nm to 88±2 nm and back to 68±2 nm. The simulated spectrum is given as dotted line.
Figure 8B:
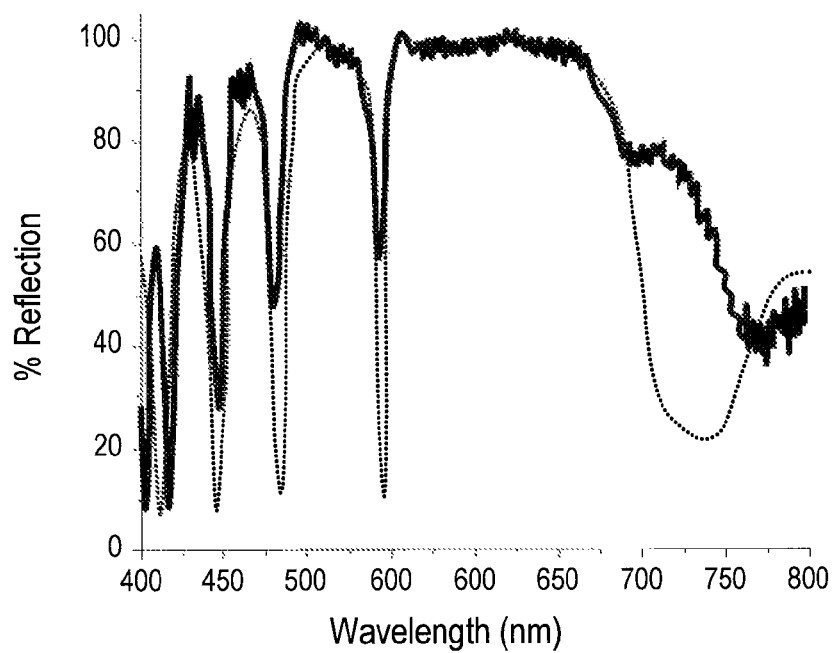

Another possibility of producing interesting optical features is to gradually induce asymmetry into a multi-layer stack. An example is shown in FIG. 8A. In this 25-layer structure of alternating silica and titania films the silica layer thickness was held constant at 44±2 nm, while the thickness of the titania layers is successively increased from 68±2 nm (left edge) to 88±2 nm (center) in 5 nm steps, and then successively decreased again to 68±2 nm (right edge). The resulting optical reflection spectrum (FIG. 8B) shows interesting features with the appearance of four narrow transmission modes between 400 and 550 nm, which are in excellent agreement with the calculated spectra. This agreement between experiment and theory for such an elaborate asymmetric multi-layer stack not only shows the precise control over single-layer thickness deposition, but also confirms the reproducibility of this simple sol-gel deposition approach over tens of consecutive layers. The presence of these narrow optical modes in these microcavity structures and asymmetric Bragg stacks should make these samples interesting candidates for light amplification applications and the inventors are currently investigating possibilities to incorporate light sources into these samples.

CONCLUSIONS

The inventors have developed a sol-gel chemistry-based dip-coating method with all the desirable attributes of solution processing—simple, fast, inexpensive and versatile—and yet produces high-quality thin-film single and multi-layer structures, rivaling those fabricated by expensive physical and chemical deposition methods. The inventors discussed causes of typical limitations of sol-gel thin-film processing such as crack formation and occurrence of structural inhomogeneities in multi-layer stacks, and introduced strategies to overcome these limitations. The inventors demonstrated that controlled and homogeneous solvent evaporation of the as-deposited films as well as rapid heating and cooling rates are keys in preventing crack formation. The latter proved particularly important for the fabrication of crack-free silica/titania multi-layer stacks with precise and reproducible thicknesses of up to 25 alternating layers. Moreover, the inventors showed that such multi-layer stacks can be deposited on a variety of substrates with planar and even curved geometries without loss of structural features.

The inventors used this sol-gel dip-coating process to fabricate high-quality optical components, including Bragg-type reflectors and filters, Fabry-Perot macrocavities, and asymmetric stacks. These photonic bandgap-based structures displayed tunable optical properties with wide reflection bands and well-defined localized cavity modes. The wavelength position of the photonic bandgap and the cavity mode can readily be tuned throughout the entire visible range by controlling the layer thickness during the dip-coating process. Tuning the width of the optical reflection band was demonstrated by fabricating titania-silica nanostructured composite layers with different titania-to-silica ratios. Experimentally obtained reflection spectra were also compared to results from simulations using the transfer-matrix method. Very good agreement was found between the measured and calculated results, confirming again the high precision and reproducibility of the fabrication process. To conclude, the versatility of sol-gel chemistry combined with this inexpensive and rapid thin-film processing route (a 20-layer silica/titania stack can be fabricated in less than two hours), makes this method an attractive alternative to conventional physical/chemical deposition and sputtering techniques. The fabricated multi-layer photonic bandgap structures possess excellent structural and optical properties and should be interesting candidates for use in optical and electronic applications.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A sol-gel method for forming a material layer on a substrate, the method comprising:
   depositing a layer of a sol-gel material that includes a dispersed solid phase and a solvent onto at least a portion of the substrate to produce a coated substrate, wherein the substrate is exposed to constant humidity and/or solvent vapor pressure during the depositing;
   evaporating the solvent from the sol-gel material deposited onto the substrate by exposing the deposited layer of sol-gel material to a hot air stream, wherein the evaporating is accomplished in a time ranging from 1 second to 10 seconds under a hot air stream having a temperature of 50° C. to 200° C.;
   calcining the substrate with the deposited layer of sol-gel material at a temperature of 250° C. to 500° C. for 1 second to 1 hour; and
   cooling the calcined substrate from the calcining temperature to room-temperature or less in 3 seconds or less by at least one of contacting the coated and calcined substrate with a heat-sink or immersing the coated and calcined substrate in a volume of liquid to yield the material layer on the substrate.

2. The method of claim 1, further comprising calcining for 5 seconds to 10 minutes.

3. The method of claim 1, further comprising calcining for 5 seconds to 1 minute.

4. The method of claim 1, wherein the deposited layer of sol-gel material has a thickness in a range of 50 nm to 1000 nm.

5. The method of claim 1, wherein the depositing includes at least one of dip coating, spin coating, spray coating, or drop casting.

6. The method of claim 1, wherein the depositing includes:
   dipping the substrate into a dipping chamber containing a sol-gel solution; and
   withdrawing the substrate from the dipping chamber at a predetermined rate to deposit the first layer of the sol-gel material onto the substrate.

7. The method of claim 6, wherein the predetermined rate of withdrawing the substrate from the dipping chamber is selected to deposit a first layer of sol-gel material onto the substrate having a selected thickness.

8. The method of claim 7, wherein the selected thickness of the first layer of sol-gel material deposited onto the substrate is affected by at least one of a viscosity of the sol-gel solution or the predetermined rate of withdrawing the substrate from the dipping chamber.

9. The method of claim 6, wherein the substrate is withdrawn from the dipping chamber at a constant rate ranging from 1 cm/min to 20 cm/min.

10. The method of claim 6, wherein the substrate is enclosed in the dip chamber while dipping and withdrawing.

11. The method of claim 1, wherein the substrate is planar.

12. The method of claim 1, wherein the substrate is non-planar.

13. The method of claim 1, further comprising:
   depositing a second layer of sol-gel material on to the substrate after calcining and cooling the first layer;
   performing the evaporating, calcining, and cooling steps on the substrate coated with the first and second layers to yield a substrate having first and second material layers deposited thereon.

14. The method of claim 13, wherein the sol-gel material used to deposit the second layer is different than the sol-gel material used to form the first layer.

15. The method of claim 13, further comprising forming multiple, alternating first and second material layers on the substrate.

16. The method of claim 15, wherein the first material layer comprises silicon dioxide ("$SiO_2$") and the second material layer comprises titanium dioxide ("$TiO_2$").

17. The method of claim 15, wherein the first and second material layers are selected from one or more metal oxides of vanadium, molybdenum, tungsten, niobium, titanium, cerium, silicon, iridium, nickel, copper, or zinc.

18. The method of claim 15, wherein each of the multiple alternating first layers have a equal thickness and each of the multiple alternating second layers have a equal thickness.

19. The method of claim 18, wherein each of the multiple alternating first layers and each of the multiple alternating second layers have the same thickness.

20. The method of claim 18, wherein each of the multiple alternating first layers has a thickness that is different than a thickness of each of the multiple alternating second layers.

21. The method of claim 15, further comprising forming at least one first or second material layer amongst the alternating first and second material layers that is thicker than the adjacent alternating first and second material layers.

22. The method of claim 15, wherein the multiple alternating first and second layers collectively form at least one of a 1D photonic crystal, a Bragg mirror, or an interferometer.

23. The method of claim 13, further comprising:
   adding a surfactant or another organic compound to the sol-gel material used to form either the first layer or the second layer; and
   forming at least two alternating first and second material layers on the substrate,
   wherein the surfactant or the other organic compound induces mesoporosity in the layer formed from the sol-gel material that includes the surfactant or the other organic compound.

24. The method of claim 1, wherein the volume of liquid includes alcohol and water.

25. The method of claim 1, wherein the sol-gel material is formed from one or more metal oxides of vanadium, molybdenum, tungsten, niobium, titanium, cerium, silicon, iridium, nickel, copper, or zinc.

26. The method of claim 1, further comprising heat-treating the substrate with the material layer deposited thereon for 1 hour at 400° C. to 500° C. to at least partially recrystallize the solid phase in the material layer, wherein the heat-treating is performed after the cooling.

* * * * *